United States Patent [19]

Yu

[11] Patent Number: 4,937,117

[45] Date of Patent: Jun. 26, 1990

[54] FLEXIBLE BELT

[75] Inventor: Robert C. U. Yu, Webster, N.Y.

[73] Assignee: Xerox Corporation, Stamford, Conn.

[21] Appl. No.: 383,790

[22] Filed: Jul. 24, 1989

[51] Int. Cl.[5] .......................... B32B 3/00; B32B 31/18

[52] U.S. Cl. ....................................... 428/57; 428/192; 156/137; 156/250

[58] Field of Search ............................ 428/57, 192, 81; 156/137, 218, 250

[56] References Cited

U.S. PATENT DOCUMENTS

| | | | |
|---|---|---|---|
| 3,546,054 | 12/1970 | Ross | 161/38 |
| 4,050,322 | 9/1977 | Moring | 74/231 J |
| 4,532,166 | 7/1985 | Thomsen et al. | 428/57 |
| 4,838,964 | 6/1989 | Thomsen et al. | 156/73.1 |

*Primary Examiner*—Alexander S. Thomas
*Attorney, Agent, or Firm*—Peter H. Kondo

[57] ABSTRACT

A flexible belt is fabricated from a substantially rectangular sheet having a first edge joined to a second parallel edge to form a seam, the seam having one end which terminates at a third end and another end which terminates at a fourth edge, the third edge and fourth edge being substantially perpendicular to the first and second edges, the third edge having a notch at the seam end, the notch having a bottom parallel to the third edge, the bottom extending in each direction from the centerline of the seam to the beginning of an arcuate side for a distance of between about 100 and about 400 times the thickness of the web, the notch having a depth of between about 4 and about 20 times the thickness of the web, the notch having substantially identical arcuate sides defined by a radius of curvature having a length of between about 40 and about 200 times the thickness of the web, and one end of each of the arcuate sides being substantially tangent to the bottom of the notch.

20 Claims, 2 Drawing Sheets

FLEXIBLE BELT

This invention relates in general to flexible belts and more specifically, to a flexible belt and process for making the flexible belt.

In the art of electrophotography an electrophotographic plate comprising a photoconductive insulating layer on a conductive layer is imaged by first uniformly electrostatically charging the imaging surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated area. This electrostatic latent image may then be developed to form a visible image by depositing finely divided electroscopic toner particles on the surface of photoconductive insulating layer. The resulting visible toner image can be transferred to a suitable receiving member such as paper. This imaging process may be repeated many times with reusable photoconductive insulating layers.

One type of known electrophotographic plate comprises a flexible photoreceptor belt fabricated from a sheet cut from a web. This photoreceptor may also comprise additional layers such as an anti-curl backing layer and an overcoating layer. The sheets are generally rectangular in shape and all sides may be of the same length or one pair of parallel sides may be longer than the other pair of parallel sides. The sheets are formed into a belt by joining opposite edges of the sheet. Joining may be effected by any suitable means. Typical joining techniques include welding, gluing, taping, pressure heat fusing, and the like. The preparation of welded belts are disclosed, for example , in U.S. Pat. No. 4,532,166 and U.S. Pat. No. 4,838,964. The ultrasonic welded seams of multilayered photoreceptor belts are realtively brittle and low in strength and toughness. The joining techniques, particularly the welding process, can result in the formation of a flashing that projects beyond the sides of the belt. This flashing tends to strike belt edge tracking guides in copiers, duplicators and printers thereby shortening the life of the seam. A common technique for removing the flashing involves the use of a reciprocating punch or notching device. The reciprocating punch has a small circular section and removes the flashing and part of the seam to form a generally semicircular notch in the side of the belt at the seam. The flexible belts are usually multilayered photopreceptors that comprise a substrate, a conductive layer, an optical hole blocking layer, an optional adhesive layer, a charge generating layer, and a charge transport layer and, in some embodiments, an anti-curl backing layer.

Although excellent toner images may be obtained with notched multilayered belt photoreceptors, it has been found that as more advanced, higher speed electrophotographic copiers, duplicators and printers were developed, tearing of flexible, seamed belt photoreceptors was encountered during extending cycling. It has been found that the semicircular notches cause belt failure during extended cycling. Premature seam rupture of flexible belt photoreceptors have occurred at a frequency as high as 3 out of every 21 belts during testing of some notched belts in a commercial xerographic duplicator. Toner build-up and dirt accumulation along an edge of electrophotographic duplicating machines and damage to the photoreceptor belts during insertion or removal from the electrophotographic duplicating machines also contribute to seam failure in flexible belt photoreceptors. There is also a great need for long service life flexible belt photoreceptors in compact imaging machines that employ small diameter support rollers for photoreceptor belt systems operating in a very confined space. Small diameter support rollers are also highly desirable for simple, reliable copy paper stripping systems which utilize the beam strength of the copy paper to automatically remove copy paper sheets from the surface of a photoreceptor belt after toner image transfer. Unfortunately, small diameter rollers, e.g. less than about 0.75 inch (19 mm) diameter, raise the threshold of mechanical performance criteria to such a high level that photoreceptor belt seam failure can become unacceptable for multilayered belt photoreceptors. Thus, in advance imaging systems utilizing multilayered belt photoreceptors, seams failure has been encountered during belt cycling over small diameter rollers. Frequent photoreceptor seam delamination has a serious impact on the versatility of a photoreceptor and reduces the its pratical value for automatic electrophotographic copiers, duplicators and printers.

Thus, seams in some multilayered belt photoreceptors can delaminate after the sheets are welded into belts and the belts tend to delaminate and tear during extended cycling over small diameter support rollers or when subjected to lateral forces caused by rubbing contact with stationary web edge guides during cycling.

INFORMATION DISCLOSURE STATEMENT

U.S. Pat. No. 4,838,964 to Thomsen et al, issued June 13, 1989 —A belt making system is described which includes means to form a notch along at least one edge of the belt.

U.S. Pat. No. 4,532,166 to Thomsen et al, issued July 30, 1985 —A welded belt is disclosed comprising a welded seam of overlapping web edges, one of the edges having at least one aperture filled with thermoplastic material supplied from the other edge.

U.S. Pat. No. 3,546,054 to Ross, issued December 8, 1970 —A means of splicing a power or conveyor belt is disclosed. The surface layers of the belt are removed to allow splicing of the inner layer. This leaves an upper and lower trough (or channel). This channel is then filled with a resin material to restore the splice zone to substantially the original thickness.

U.S. Pat. No. 4,050,322 to Moring, issued September 27, 1977 —The splicing of a belt is disclosed in which a compression resistant reinforcement between the spliced inner structure of a belt and the outer cover material is utilized. These two components are located in the channel region of the joint.

Thus, there is a continuing need for flexible belt electrostatographic imaging members having improved resistance to tearing, delamination, and cracking at seams.

SUMMARY OF THE INVENTION

It is, therefore, an object of the present invention to provide an improved photoresponsive member which overcomes the above-noted disadvantages.

It is yet another object of the present invention to provide an improved electrophotographic member having a seam that exhibits greater resistance to tearing.

It is still another object of the present invention to provide an improved electrophotographic member with a seam exhibiting greater resistance to delamination.

It is another object of the present invention to provide an improved electrophotographic member which has improved seam strength.

It is yet another object of the present invention to provide an electrophotographic imaging member exhibits its greater seam toughness.

The foregoing object and others are accomplished in accordance with this invention by providing a flexible belt fabricated from a substantially rectangular sheet having a first edge joined to a second parallel edge to form a seam, the seam having one end which terminates at a third edge and another end which terminates at a fourth edge, the third edge and fourth edge being substantially perpendicular to the first and second edges, the third edge having a notch at the seam end, the notch having a bottom parallel to the third edge, the bottom extending in each direction from the centerline of the seam to the beginning of a arcuate side for a distance of between about 100 and about 400 times the thickness of the web, the notch having a depth of between about 4 and about 20 times the thickness of the web, the notch having substantially identical arcuate sides defined by a radius of curvature having a length of between about 40 and about 200 times the thickness of the web, and one end of each of the arcuate sides being substantially tangent to the bottom of the notch.

Electrostatographic flexible belt imaging members are well known in the art. Typical electrostatograph flexible belt imaging members include, for example, photoreceptors for electrophotographic imaging systems and electroceptors or ionographic members for electrographic imaging systems.

Electrostatographic flexible belt imaging member may be prepared by various suitable techniques. Typically, a flexible substrate is provided having an electrically conductive surface. For electrophotographic imaging members, at least one photoconductive layer is then applied to the electrically conductive surface. A charge blocking layer may be applied to the electrically conductive layer prior to the application of the photoconductive layer. If desired, an adhesive layer may be utilized between the charge blocking layer and the photoconductive layer. For multilayered photoreceptors, a charge generation binder layer is usually applied onto the blocking layer and charge transport layer is formed on the charge generation layer. For ionographic imaging members, an electrically inulating dielectric layer es applied to the electrically conductive surface.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like which are flexible as thin webs. The electrically insulating or conductive substrate should be flexible and in the form of an endless flexible belt. Preferably, the endless flexible belt shaped substrate comprises a commercially available biaxially oriented polyester known as Mylar, available from E.I. du Pont de Nemours & Co. or Melinex available from ICI.

The thickness of the substrate layer depends on numerous factors, including beam strength and economical considerations, and thus this layer for a flexible belt may be of substantial thickness, for example, about 125 micrometers, or of minimum thickness than 50 micrometers, provided there are no adverse effects on the final electrostatographic device. In one flexible belt embodiment, the thickness of this layer ranges from about 65 micrometers to about 150 micrometers, and preferably from about 75 micrometers to about 100 micrometers for optimum flexibility and minimum stretch when cycled around small diameter rollers, e.g. 19 millimeter diameter rollers. The surface of the substrate layer is preferably cleaned prior to coating to promote greater adhesion of the deposited coating. Cleaning may be effected, for example, by exposing the surface of the substrate layer to plasma discharge, ion bombardment and the like.

The conductive layer may vary in thickness over substantially wide ranges depending on the optical transparency and degree of flexibility desired for the electrostatographic member. Accordingly, for a flexible photoresponsive imaging device, the thickness of the conductive layer may be between about 20 angstrom units to about 750 angstrom units, and more preferably from about 100 Angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. Typical vaccum depositing techniques include sputtering, magnetron sputtering, RF sputtering, and like. Magnetron sputtering of metals onto a substrate can be effected by a conventional type sputtering module under vacuum conditions in an inert atmosphere such as argon, neon, or nitrogen using a high purity metal target. The vacuum conditions are not particularly critical. In general, a continuous metal film can be attained on a suitable substrate, e.g. a polyster web substrate such as Mylar available from E.I du Pont de Nemours & Co. with magnetron sputtering. It should be understood that vaccum deposition conditions may all be varied in order to obtain the desired metal thickness. Typical RF sputtering systems such as a modified Materials Research Corporation Model 8620 Sputtering Module on a Welch 3102 Turbomolecular Pump is described in U.S. Pat. No. 3,926,762, the entire disclosure of which is incorporated herein in its entirety. This patent also describes sputtering a thin layer of trigonal selenium onto a substrate which may consist of titanium. Another technique for depositing a metal by sputtering involves the use of planar magnetron cathodes in a vaccum chamber. A metal target plate may be placed on a planar magnetron cathode and the substrate to be coated can be transported over the metal target plate. The cathode and target plate are preferably horizontally positioned perpendicular to the path of substrate travel to ensure that the deposition of target material across the width of the substrate if of uniform thickness. If desired, a plurality of targets ad planar magnetron cathodes may be empolyed to increase throughput, coverage or vary layer compositions. Generally, the vacuum chamber is sealed and the ambient atmosphere is evacuated to about $5\times10^{-6}$ mm Hg. This step is immediately followed by flusing the entire chamber with argon at a partial pressure of about $1\times10^{-3}$ mm Hg to remove most residual wall gas impurities. An atmosphere of argon at about $1\times10^{-4}$ mm Hg is introduced into the vacuum chamber in the region of sputtering. Electrical power is then applied to the planar magnetron and translation of the substrate at approximately 3 to about 8 meter per minute is commenced.

If desired, an alloy of suitable metals may be deposited. Typical metal alloys may contain two or more metals such as zirconium, niobium, tantalum, vanddium and hafnium, titanium, nickel stainless steel, chromium, tungsten, molybdenum, and the like, and mixtures thereof. Regardless of the technique employed to form the metal layer, a thin layer of metal oxide forms on the outer surface of most metals upon exposure to air. Thus, when other layers overlying the metal layer are characterized as "contiguous" layers, it is intended that these overlying contiguous layers may, in fact, contact a thin metal oxide layer that has formed on the outer surface of the oxidizable metal layer. Generally, for rear erase exposure, a conductive layer light transparency of at least about 15 precent is desirable. The conductive layer need not be limited to metals. Other examples of conductive layers may be combinations of materials such as conductive indium tin oxide as a transparent layer for light having a wavelength between about 4000 Angstroms and about 7000 Angstroms or a conductive carbon black dispersed in a plastic binder as an opaque conductive layer. A typical electrical conductivity for conductive layers for electrophotographic imaging members in slow speed copiers is about $10^{-2}$ to $10^{-3}$ ohms/square.

After formation of an electrically conductive surface, a hole blocking layer may be applied thereto fo photoreceptors. Generally, electron blocking layers for positively charged photoreceptors allow holes from the imaging surface of the photoreceptor to migrate toward the conductive layer. Any suitable blocking layer capable of forming an electronic barrier to holes between the adjacent photoconductive layer and the underlying conductive layer may be utilized. The blocking layer may be nitrogen containing siloxanes or nitrogen containing titanium compounds such as trimethoxysilyl propylene diamine, hydrolyzed timethoxysilyl propyl ethylene diamine, N-beta-(aminoethyl) gamma-aminopropyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N-ethylamino-ethylamino)titanate, ispropyl trianthranil titanate, isopropyl tri(N,N-dimethylethylamino)titanate, titanium-4-amino benzene sulfonat oxyacetate, titanium 4-aminobenzoate isostearate oxyacetate, $[H_2N(CH_2)_4]CH_3Si(OCH_3)_2$, (gamma-aminobutyl) methyl diethoxysilane, and $[H_2N(CH_2)_3]CH_3Si(OCH_3)_2$ (gamma-aminopropyl) methyl diethoxysilane, as disclosed in U.S. Pat. Nos. 4,291,110, 4,338,387, 4,286,033 and 4,291,110. The disclosures of U.S. Pat. Nos. 4,338,387, 4,286,033 and 4,291,110 are incorporated herein in their entirety. A preferred blocking layer comprises a reaction product beween a hyrolyzed silane and the oxidized surface of a metal ground plane layer. The oxidized surface inherently forms on the outer surface of most metal ground plane layers when exposed to air after deposition. The blocking layer may be applied by any suitable conventional technique such as spraying, dip coating, draw bar coating, gravure coating, silk screening, air knife coating, reverse roll coating, vaccum deposition, chemical treatment and the like. For convenience in obtaining thin layers, the blocking layers are preferably applied in the form of a dilute solution, with the solvent being removed after deposition of the coating by conventional techniques such as by vacuum, heating and the like. The blocking layer should be continuous and have a thickness of less than about 0.2 micrometer because greater thicknesses may lead to undesirably high residual voltage.

An optional adhesive layer may applied to the hole blocking layer. Any suitable adhesive layer well known in the art may be utilized. Typical adhesive layer materials include, for example, polyesters, duPont 49,000 (available from E.I. duPont de Nemours and Company), Vitel PE100 (available from Goodyear Tire & Rubber), polyurethanes, and the like. Satisfactory results may be achieved withe adhesive layer thickness between about 0.05 micrometer (500 anstroms) and about 0.3 micrometer (3,000 angstroms). Conventional techniques for applying an adhesive layer coating mixture to the charge blocking layer include spraying, dip coating, roll coating, wire wound rod coating, gravure coating, Bird applicator coating, and the like. Drying of the deposited coating may be effected by any suitable conventional technique such as oven drying, infra red radiation drying, air drying and the like.

Any suitable photogenerating layer may be applied to the adhesive blocking layer which can then be overcoated with a contiguous hole transport layer as described hereinafter. Examples of typical photogenerating layers include inorganic photoconductive particles such as amorphous selenium, trigonal selenium, and seleniuim alloys selected from the group consisting of selenium-tellurium, selenium-tellurium-arsenic, selenium arsenide and mixtures thereof, and orgainc photoconductive particles including various phthalocyanine pigment such as the X-form of metal free phthalocyanine described in U.S. Pat. No. 3,357,989, metal phthalocyanines such as vanadyl phthalocyanine and copper phthaloxyanine, dibromoanthanthrone, squarylium, quinacridones available from DuPont under the tradename Monastral Red, Monastral violet and Monastral Red Y, Vat orange 11 and Vat orange 3 trade names for dibromo anthanthrone pigments, benzimidazole perylene, substituted 2,4-diamino-triazines disclosed in U.S. Pat. No. 3,442,781, polynuclear aromatic quinones available from Allied Chemical Corporation under the tradename Indofast Double Scarlet, Indofast Violet Lake B, Indofast Brillant Scarlet and Indofast Orange, and the like dispersed in a film forming polymeric binder. Multi-photogenerating layer compositions may be utilized where a photoconductive layer enhasces or redices the properties of the photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layers comprising particles or layers comprising a photoconductive material such as vanadyl phthalocyanine, metal free phthaloclyanine, benzimidazole perylene, amorphus selenium, trigonal selenium, selenium alloys such as selenium-tellurium, selenium-tellurium-arsenic, selenium arsenide, and the like and mixture thereof are especially preferred because of their sensitivity to white light. Vanadyl phthalocyanine, metal free phthalocyanine and tellurium alloys are also preferred becuase these materials provide the additional benefit of being sensitive to infra-red light.

Any suitable polymeric film forming inder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarrylethers, polyarylsulfones, polybutadienes, polysulfones, polyethersulfones, polyethylenes, polypropylenes, polyinides, polymethylpenetenes, polyphenylene sulfides, polyvinyl acetate, polysiloxanes, polyacrylates, polyvinul acetals, polyamides, polyinides, amino resins, phenylene oxide resins, terephthalic acid resins, phenoxy resins, epoxy rresins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloridevinylchloride copolymers, vinylacetatevinylidenechloride copolymers, styrene-alkyd resins, polyvinylcarbazole, and the like. These polymers may be block, readom or alternating copolymers.

The phogenerating composition or pigment is present in the resinous binder composition in various amounts, generally, however, from about 5 percent by volume to about 90 percent by volume of photogenerating pigment is dispersed in about 10 percent by volume to about 95 percent volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating piment is dispersed in about 92 percent by volume of the resinous binder composition.

The photogenerating layer containing photoconductive compositions and/or pigments and the resinous binder material generally ranges in thickness of from about 0.1 mocrometer to about 5.0 micrometers, and preferably has a thickness of from about 0.3 lmocrometer to about 3 micrometers. The photogenerating layer thickness is related to binder content. Higher binder content compositions generally require thicker layers for photogeneration. Thickness outside these ranges can be selected providing the objects of the present invention are achieved.

Any suitable and conventional technique may be utilized to mix and thereafter apply the poltogenerating layer coating mixture. Typical application techniques include spraying, dip coating, roll coating, wire wound rod coating, and the like. Drying of the depsitied coating may be effected by any suitable conventional technique such as oven drying, infra red radiation drying, air drying and the like.

The active charge transport alyer may comprise an activating compound useful as an additive dispersed in electrically inactive polymeric materials making these naterials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of alowing the transport of these holes through the active layer in order to discharge the surface charge on the active layer. An especially preferred transport layer employed in one of the two electrically operative layers in the multilayered photoconductor of this invention comprises from about 25 percent to about 75 percent by weight of at least one charge transporting aromatic amine compound, and about 75 percent to about 25 percent by weight of polymeric film forming resin in which the aromatic amine is soluble.

The charge transport layer forming mixture preferably comprises an aromatic amine compound of one or more compounds having the general formula:

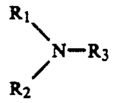

wherein $R_1$ and $R_2$ are an aromatic group selected from the group consisting of a substituted or unsubstituted phenyl group, naphthyl group, and polyphenyl group and $R_3$ is selected from the group consisting of a substituted or unsubstituted aryl group, alkyl group having from 1 to 18 carbon atoms and cycloaliphatic compounds having from 3 to 18 carbon atoms. The substituents should be free from electron withdrawing groups such as $NO_2$groups, CN groups, and the like.

Examples of charge transporting aromatic amines represented by the structural formulae above for charge transport layers capable of supporting the injection of photogenerated holes of a charge generating layer and transporting the hled through the charge transport layer include triphenylmethane, bis(4-diethylamine-2-methylphenyl)phenylmethane; 4'-4''-bis(diethylamino)-2',2''-diamine wherein the alkyl is, for example, methyl, ethyl, propyl, n-butyl, etc., N,N'-diphenyl-N,N'-bis(-chlorophenyl)-[1,1'-biphenyl]-4,4'-diamine, N,N'-diphenyl-N,N'-bis(3''-methylphenyl)-(1,1'-biphenyl)-4,4'-diamine, and the like dispersed in an inactive resin binder.

Any suitable inactiv eresin binder soluble in methylene chloride or thoer suitable solvent may be employed in the process of this invnetion. Typical inactive resin binders soluble in menthylene chloride include polycarbonate resin, polyvinylcarbazole, polyester, polyarylate, polyacrylate, polyether, polysulfone, and the like. Molecular weights can vary from about 20,000 to about 150,00.

Any suitable and conventional technique may be utilized to mix and thereafter apply the charge transport layer coating mixture to the charge generating layer. Typical application techniques include spraying, dip coating, roll coating, wire wound rod coating, and the like. Drying of the deposited coating may be effected by an suitable conventional technique such as oven drying, infra red radiation drying, air drying and the like.

Generally, the thickness of the hole transport layer is between about 10 to about 50 micrometers, but thickness outside this range can also be used. The hole transport layer should be an insulator to the extent that the electrostatic charge placed on the hole transport layer is not conducted in the absence of illmination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

the preferred electrically inactive resin materials are polycarbonate resins have a molecular weight from about 20,000 to about 150,000, more preferably from about 50,000 to about 120,000. The materials most preferred as electrically inactive resin material is poly(4,4'-dipropylidene-diphenylene carbonate) with a molecular weight of from about 35,000 to bout 40,000, available as Lexan 145 from General Electric Company; poly(4,4'-isopropylidene-diphenylene carbonate) with a molecular weight of from about 40,000 to about 45,000, available as Lexan 141 from the General Electric Company; a polycarbonate resin having a molecular weight of from about 50,000 to about 120,000, available as Makrolon from Fargenfabricken Bayer A. G. and a polycarbonate resin having a molecular weight of from about 20,000 to about 50,000 available as Merlon from Mobay Chemical Company. Methylene chloride solvent is a desirable component of the charge transport layer coating mixture for adequate dissolving of all the components and for its low boiling point.

Examples of photosensitive members having at least two electrically operative layers include the charge generator layer and diamine conataining transport layer member disclosed in U.S. Pat. Nos. 4,265,990, 4,233,384, 4,306,008, 4,299,897 and 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

Other layers such as conventional electrically conductive ground strip along one edge of the belt in contact with the conductive layer, blocking layer, adhesive layer or charge generating layer to facilitate connection of the electrically conductive layer of the photoreceptor to ground or to an electrical bias. Ground stripes are well known and comprise usually comprose conductive particles dispersed in a film forming binder.

Optionally, an overcoat layer may also be utilized to improve resistance to abrasion. In some cases an anti-curl back coating may be applied to the side opposite the photoreceptor to provide flatness and/or abrasion resistance. These overcoating and anti-curl back coating layers are well known in the art and may comprise thermoplastic organic polymers or inorganic polymers that are electrically insulating or slightly semiconductive. Overcoating are continuous and generally have a thickness of less than about 10 micrometers. The thickness of anti-curl backing layers should be sufficient to substantially balance the total forces of the layer or layers on the opposite side of the supporting substrate layer. The total forces are substantially balanced when the belt has no noticeable tendency to curl after all the layers are dried. For example, for an electrophotographic imaging member in which the bulk of the coating thickness of the photoreceptor side of the imaging member is a transport layer containing predominantly polycarbonate resin and having a thickness of about 24 micrometers on a Mylar substrate having a thickness of about 76 micrometers, sufficient balance of forces can be achieved with a 13.5 micrometers thick anti-curl layer containing about 99 percent by weight polycarbonate resin, about 1 percent by weight polyester and between about 5 and about 20 percent of coupling agent treated crystalline particles. An eaxample of an anti-curl backing layer is described in U.S. Pat. No. 4,654,284 the entire disclosure of this patent being incorporated herein by reference. A thickness between about 70 and about 160 micrometers is a satisfactory range for flexible photoreceptors. Thickness between about 85 micrometers and about 145 are preferred and optimum results are achieved with a photoreceptor having a thickness of between about 90 micrometers and about 135 micrometers.

For electrographic imaging memgers, a flexible dielectric layer overlying the conductive layer may be substituted for the photoconductive layers. Any suitable, conventional, flexible, electrically insulating dielectric polymer may be used in the dielectirc layer of the electorgraphic imaging member. If desired, the felxible belts of this invention may be used for other purposes where cycling durability is important.

Generally, electrostatographic imaging members are fabricated from webs by cutting the webs into rectangular sheets, overlapping a small segment of opposite edges of each sheet to form a loop and securing the overlapping edges of the sheet together to form a narrow seam. The overlapping edges of the sheet may be secured to each other by any suitable technique such as ultrasonic welding, gluing, taping, pressure heat fusing, and the like. The preparation of wleded belts is well known and disclosed, for example, in U.S. Pat. No. 4,532,166 and U.S. Pat. No. 4,838,964. The disclosure of these patents are incorporated herein in their entirety. As discussed hereinabove, the joining techniques, particularly the wekding process, usually forms a flashing of thermoplastic material from the welded belt that projects beyond the sides of the belt at the ends of the seam. This flashing tends to strile belt edge tracking guides in copiers, duplicators and printers thereby forming tear initiation sites which shorten the life of the seam. The flashing in prior art photoreceptors is removed by means of a reciprocating punch which removes the flashing and part of the seam to form a notch in the side of the belt at the seam, the notch having the shape of a segment of a circle. It is believed that a semicircular notch present at the seam ends of an electrostatographic imaging member can act as a focal point for concentrating stress to significantly reduce the strength and toughness of the seam and facilitate rupture at the seam when the imaging member is subjected to tension stress.

Significantly improved resistance to seam rupture is achieved in the flexibel belt of this invention by providing a flexible belt fabricated from a substantially rectangular sheet having a first edge joined to a second parallel edge to form a seam, the seam having one end which terminates at a third edge substantially perpendicular to the first and second edges, the third edge having a notch at at least one seam end, the notch having an elongated shape with arcuate ends and a bottom substantially parallel to the third edge. Satisfactory results are achieved when the length of the bottom of the notch is equal to twice the distance from the seam centerline to the beginning of an arcuate side, where the distance is between about 100 and about 400 times the thickness of the photoreceptor because this avoids undue stress concentration at the center of the seam. The beginning of the arcuate side is the point at which the straight line of the notch bottom begins to curve away from the bottom, i.e. at the point of tangency of the arcuate side with the bottom. For measurememt purposes, the thickness of the web is the entire thickness of the web (including all layers) and is determined at a location other than at the seam or ground strip (if present). A seam centerline to the beginning of a arcuate side distance of between about 150 and about 350 times the thickness of the photogrceptor is prefereed for half the length of the bottom. For optimum results, the bottom of the notch should extend from each side of the centerline of the seam to the the beginning of an arcuate side for a distance of between about 200 and about 300 times the thickness of the web. A satisfactory notch depth is between about 4 and about 20 times the thickness of the web. When the depth of the notch is less than about 4 times the thickness of the web, the formation of this notch is extremely difficult to form due to punch equipnent limitations. If the depth of the notch is greater than about 20 times the thickness of the web, the effect (advantage) of stress concentration avoidance at the seam begins to diminish. A notch depth between about 6 and about 15 times the thickness of the web is preferred and optimum results are achieved with a notch depth between about 7 and about 12 times the thickness of the web.

The arcuate sides should be substantially identical and be defined by a radius of curvature having a length of between about 40 and about 200 times the thickness of the web. If the arcuate sides are defined by a radius of curvature having a length less than about 40 times greater than the thickness of the web, the improved tensile stress will be focused at the curvature. Where the arcuate sides are defined by a radius of curvature having a length greater than about 200 times greater than the thickness of the web, the gain in stress dissipation at 150 times begins to reach an optimum and level off. A radius of curvature having a length between about 60 and about 180 times greater than the thickness of the web is prefereed and optimum performance is achieved when the radius of curvature is between about 80 and about 150 times greater than the thickness of the web. One end of each of the arcuate sides should also be substantially tangent to the bottom of the notch to ensure notch continuity and strength. The notch configuration for the seam edge of a seamed polymer belt of this invention maximizes seam strength. The notch width moves the highest stress region away from the center of the seam and the arcuate notch dissipate stress concentrations. The notch should be wider than the seam. A typical seam width for a photoreceptor belt is about 1.3 mm and a typical photoreceptor belt thickness is about 0.116 mm.

The flashing at athe ends of welded seams of belts of this invention can be removed by means of any suitable notching device capable of cutting the desired elongated shape. Typical means for forming a notch include, for example, a punch, laser beam cutter, template and scalpel, and the like. One type of preferred cutting device comprises a reciprocatable punch having a cross section that includes a segment that matches the elongated notch to be punched and a die having an opening to receive the punch, the cross section of the opening matching the cross section of the punch. The reciprocating punch removes the flashing and part of the seam to form an elongated notch in the side of the belt at the seam.

BRIEF DESCRIPTION OF THE DRAWINGS

A more complete understanding of the process of the present invention can be obtained by reference to the accompanying drawings wherein.

DETAILED DESCRIPTION OF THE DRAWINGS

Figure 1:
FIG. 1 is a schematic illustration of a segment of a flexible multilayered photoreceptor belt.
Figure 2:
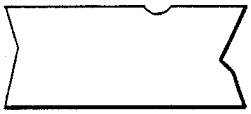
FIGS. 2 through 6 are schematic illustrations of segments of flexible multilayered photoreceptor belts, each having a semicircular notched edge.
Figure 3:
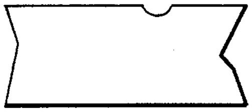
Figure 4:
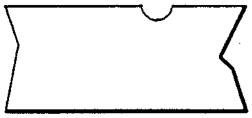
Figure 5:
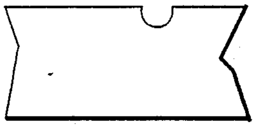
Figure 6:
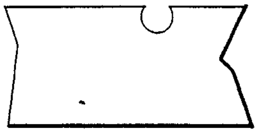
Figure 7:
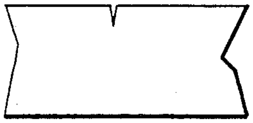
FIGS. 7 and 8 are schematic illustrations of segments of flexible multilayered photoreceptor belts, each having a "V" shaped notched edge.

Referring to FIG. 1, a rectangular, seamless, flexible, multilayered photoreceptor control sample is shown which does not have any notches on either long edge. In FIGS. 2 through 6, notched seamless multilayered photoreceptor samples are shown with notches prepared from a punch having a circular cross section, the different notches being formed by exposure of an edge of photoreceptor samples to progressively larger segment of the circular cross section of the punch. Under tensile loading, the control sample stretched, yielded with plastic deformation, and absorbed a large amount of energy before tensile rupture at 15.35 Kg/cm. The maximum percent deformation calculated at this failure point was approximately 120 percent. The presence of a circular segment notch in the samples illustrated in FIGS. 4 through 8 exhibited reduced ultimate tensile strength and greater susceptibility to premature rupture at the notch under stress. The expression "ultimate tensile strength" is defined as the tensile force per unit width (of a test sample) that is required to break the sample. Although the decrease in strength by the presence of a circular notch was only about 7.8 percent, nevertheless, the reduction in energy absorption prior to sample rupture was significant and ranged from about 56 percent for the sample illustrated in FIG. 2 to 92 percent for the sample shown in FIG. 6 thereby demonstrating the effect of greater notch punch penetration into the edge of the photoreceptor at an edge. This reduction in toughness of a photoreceptor is very important and may have a devastating effect in decreasing the service life of the photoreceptor.

Figure 8:
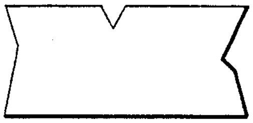

Referring to FIGS. 7 through 11, identical rectangular samples of a seamless, flexible, multilayered photoreceptor having notches with the same depth by of different geometric shapes are shown. When the sample illustrated in FIG. 7 was subjected to tension loading, the tip of the "V" shaped notch instantaneously became a focal point of stress conccentration. The sample stretched only to a limited amount and ruptured permaturely at ultimate tensile strength of 9.31 Kg/cm. The same type of energy absorption mechanism of rupture was also observed for a sample having a larger angular notch as shown in FIG. 8

Figure 9:
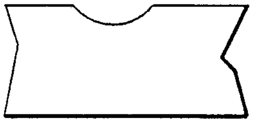
FIG. 9 is a schematic illustration of a segment of a flexible multilayered photoreceptor belt having an arcuate shaped notched edge.

In FIG. 9, a sample of a seamless, flexible, multilayered photoreceptor is shown in which the notch is prepared from a punch having a large diameter circular cross section. Increasing the diameter of a notch punch having a circular cross section and, consequently, the circle segment notch prepared with the punch can significantly increase the ultimate tensile strength and toughness of a flexible photoreceptor. This result is due to the greater dispersion of stress along the edge of a circle segment having a larger radius of curvature.

Figure 10:
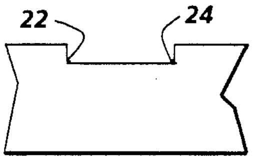
FIG. 10 is a schematic illustration of a segment of a flexible multilayered photoreceptor belt having a rectangular shaped notched edge.
Figure 11:
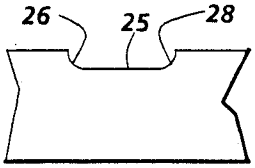
FIG. 11 is a schematic illustration of a segment of a flexible multilayered photoreceptor belt having an elongated shaped notched edge, the notch having arcuate ends defined by a short radius of curature.
Figure 12:
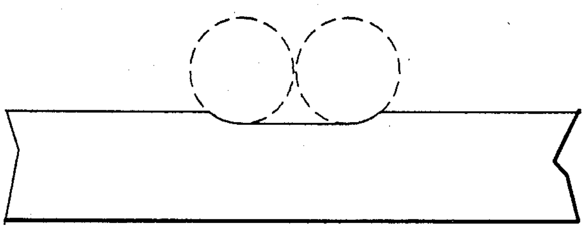
FIG. 12 is a schematic illustration of a segment of a flexible multilayered photoreceptor belt having an elingated shaped notched dege, the notch having arcuate ends defined by a long radius of curvature.

Referring to FIG. 10, a sample of a seamless, flexible, multilayered photoreceptor is shown in which the notch has a rectangular shape. Lower tensile strength was observed for this sample becuase stress concentrated at the shape corners to initiate a tear. The observed rupture mechanism through the corner was the same as that which occured in samples with angular "V" shaped notches. However, when these corners are rounded (e.g. to have radius of curvature of 0.15 cm for notches in other samples of a seamless, flexible, multilayered photoreceptor (see FIG. 11), a significant degree of improvement in the mechanical properties was achieved. Thus, referring to FIG. 11, notched, seamless, multilayered photoreceptor samples in which the notch has a rectangular shape and notch ends that had a realtively small radius of curvature at the corners exhibited improved ultimate tensile strength as compared to the sample shown in FIG. 10. Samples having progressively larger radii of curvature at the corners exhibited increased ultimate tensile strength as the radius of curvature increased to an optimum maximum ultimate tensile strength value range at a radius of curvature having a length of between about 80 to about 150 times grater than the thickness of the photoreceptor. The maximum value of a sample having a large radius of curvature at each end of the notch (see FIG. 12) was identical to the ultimate tensile strength value obtained for the control sample (see FIG. 1) having no notch.

Figure 13:
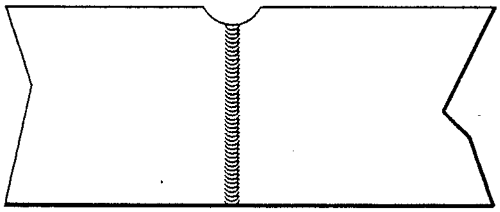
FIG. 13 is a schematic illustration of a segment of a flexible multilayered photoreceptor belt having a circle segment shaped notched edge at one end of a welded seam. &
Figure 14:
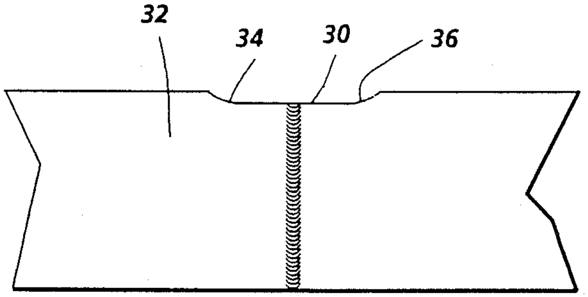
FIG. 14 is a schematic illustration of a segment of a flexible multilayered photoreceptor belt having an elongated shaped notched edge at one end of a welded seam, the notch having arcuate ends defined by a long radius of curvature.

A similar series of flexible, multilayered photoreceptor samples were tested, these samples having a welded seam located at the corner of the notch as illustrated in FIGS. 13 and 14. Both samples had the same notch depth of 1 mm and differed in notch shape in that the sample shown in FIG. 13 had a circle shape and the sample shown in FIG. 14 had a notch bottom 30 that was parallel to sample edge 32 and notch ends 34 and 36 that comformed to a radius of curvature having a length of between about 80 to about 150 times greater than the thickness of the photoreceptor. The ultimate tensile strength for the sample illustrated in FIG. 14 was significantly higher than that of the sample shown in FIG. 13. & These figures merely shcematically illustrate the invention and are not intended to indicate relative size and dimensions of actual belts, notches or components thereof.

Although an increase the radius of cuvature of a circle segment notch in an electrostatographic imaging member sample can substantially increase the rupture strength of the P/R, nevertheless tensile rupture cohntinues to occur through the middle of the arc of a circle segment notch thereby reducing the benefits of this design because this is location of the vulnerable imaging member seam. The improved notched percent increase in the seam rupture strength over the strength of conventional seam notch designs of electrostatographic imaging members.

A number of examples are set forth hereinbelow and are illustrative of different compositions and conditions that can be utilized in practicing the invention. All proportions are by weight unless otherwise indicated. It will be apparent, however, that the invention can be praticed with many types of compositions and can have many different uses in accordance with the disclosure above and as pointed out hereinafter.

EXAMPLE I

A rectangular control test sample was prepared from a flexible, seamed, multilayered Xerox 1075 ® Copier/-Duplicator photoreceptor belt. The belt comprised an anti-curl back layer, a polyester supporting substrate layer, an aluminum conductive ground plane, a charge blocking layer, an adhesive layer, a charge generating layer and a charge transport layer. The anti-curl back layer, substrate layer, adhesive layer, generating layer and transport layer each contained a thermoplastic film forming polymer. The thickness of the photoreceptor belt was about 116 micrometers. The samples were slit from segments of the photoreceptor that were free of any seam. The rectangular control sample was cut from the photoreceptor belt and had a length of 15.24 cm and a width of 1.27 cm (0.5 inch) and resembled the sample shown in FIG. 1.

EXAMPLE II

The procedures described in Example I was repeated to form another test sample, except that a notch was made at the center of one long edge of the rectangular sample and the total width of this Example was 1.27 cm (0.5 inch) plus the depth of the notch. Thus the width of the sample at the sample neck (distance between the bottom of the notch and the notch free side) was 1.27 cm (0.5 inch). The notch was prepared from a punch having a circular cross section and a diameter of 0.70 cm and the resulting notched sample resembled the sample illustrated in FIG. 2. The depth of the notch was 0.10 cm.

EXAMPLE III

The procedure descrobed in Example II was repeated to form another test sample, except that the depth of the notch was 0.20 cm. The width of the sample at the sample neck (distance between the bottom of the notch and the notch free side) was again 1.27 cm (0.5 inch). The resulting notched sample resembled the sample illustrated in FIG. 3.

EXAMPLE IV

The procedure described in Example II was repeated to form another test sample, except that the depth of the notch was 0.35 cm. The width of the sample at the sample neck (distance between the bottom of the notch and the notch free side) was again 1.27 cm (0.5 inch). The resulting notched sample resenbled the sample illustrated in FIG. 4.

EXAMPLE V

The procedure described in Example II was repeated to form another test sample, except that the depth of the notch was 0.45 cm. The width of the sample at the sample neck (distance between the bottom of the notch and the notch free side) was again 1.27 cm (0.5 inch). The resulting notched sample resenbled the sample illustrated in FIG. 5.

EXAMPLE VI

The procedure described in Example II was repeated to form another test sample, except that the depth of the notch was 0.55 cm. The width of the sample at the sample neck (distance between the bottom of the notch and the notch free side) was again 1.27 cm (0.5 inch). The resulting notched sample resenbled the sample illustrated in FIG. 6.

EXAMPLE VII

The sample described in Examples I through VI were tested to determine the effects of notch penetration (depth) on the strength of the photoreceptor. Under tensile loading in an Instron Tensile test machine at a cross head speed of 0.2 inch/min and a chart speed of 2 inch/min, the control sample of Example I stretched, yielded with palstic deformation, and absorbed large amounts of energy before tensile rupture at 15.35 Kg/cm. The maximum jpercent elongation calculated at this failure point was approximately 120 percent. The maximum percent elongation is calculated using the formula:

$$\frac{l_f - l_0}{l_0}$$

where $I_f$ equals the sample lenght when stretched to the point of rupture and $I_0$ is the initial sample length proir to stretching.

The results of identical tests for ultimate tensile strength and corresponding energy absorption for the control (Example I) and the notched samples of Example II through VI are tabualted in TAble 1below.

TABLE 1

Ultimate Tensile Properties of Notched Photoreceptor

| Example | Ultimate Tensile Strength (kg/cm) | Area Under Stress-Elongation Curve |
|---|---|---|
| I(Control) | 15.39 | 162 |
| II | 12.81 | 71 |
| III | 12.49 | 25 |
| IV | 12.84 | 18 |
| V | 12.78 | 17 |
| VI | 12.75 | 13 |

The presence of a circle segment notch in the samples not only reduced the ultimate tensile strength of the photoreceptor, it also increased the likelihood of premature photoreceptor rupture under stress. Although the decrease in strength due to the presence of a circle segment notch was only about 7.8 percent, nevertheless, the reduction in engegy absorption before sample rupture was significant and, depending on the degree of notch penetration, ranged from 56 percent for the sample of Example II to 92 percent for the sample of Example VI. This reduction in toughness of a photoreceptor can have a devastating effect by decreasing service life of the photoreceptor.

EXAMPLE VIII

A second set of photoreceptors samples prepared as described in Example I with no seams was tested to determine the effects on the strength of different notches having identical depth of 0.3 cm, but different geometric shapes, The width of the samples at the sample neck (shortest distance between the bottom of the notch and the notch free side) was again 1.27 cm (0.5 inch). The notches of these samples had shapes similar to the shapes illusrtrate in FIGS. 7 through 11. The shape and size of a notch in each sample is set forth in the first two columns of Table 2 below. The length of the bottom of rectangular notches listed in the second column was measured from the tangent point intersection between the straight bottom and the arcuate side. The notches were cut with the aid of a template and scalpel. The area integrated under the strss vs. elongation curve tabulated in the fourth column is based on a cross head speed of 0.2 inch/min and a chart speed of 2 inch/min of a Instron Tensile testing machine.

TABLE 2

Ultimate Tensile Properties of Notched Photoreceptor

| Sample | Description | Ultimate Tensile Strength, Kg/cm | Area Under Stress Elongation Curve |
|---|---|---|---|
| Control | Regular | 15.39 | 162 |
| Slit | Crack | 9.31 | <4 |
| Angular Notch | 90 Degrees | 9.32 | <4 |
| Angular Notch | 60 Degrees | 9.35 | <4 |
| Angular Notch | 30 Degrees | 9.33 | <4 |
| Circular Notch | 1.6 cm Rad. of Curvature | 15.26 | 85 |
| Circular Notch | 1.25 cm Rad. of Curvature | 14.28 | 48 |
| Circular Notch | .65 cm Rad. of of Curvature | 13.35 | 22 |
| Circular Notch | 0.3 cm Rad. of Curvature | 12.84 | 18 |
| Rect. Notch (Sharp Corner) | L = 2.5 cm | 10.73 | <4 |
| Rect. Notch (Sharp Corner) | L = 1.3 cm | 10.38 | <4 |
| Rect. Notch (Rounded Corner) | L = 1.3 cm 0.15 cm Rad. of Curvature | 11.90 | 17 |
| Rect. Notch (Rounded Corner) | L = 2.5 cm 0.3 cm Rad. of Curvature | 12.71 | 26 |

The results calclualted for ultimate tensile strengths and areas integrated under the stress-elongated (s-e) curves are set forth in columns 3 and 4 of Table 2, respectively. When the sample having a slit notch was placed under tension loading, the crack apex instantly became a focal point of stress concentration. The sample stretched only to a limited amount and ruptured prematurely at ultimate tensile strength of 9.31 Kg/cm. The energy absorption calculated by integrating the area under the (s-e) curve gave a low value of less than 4. The same mechanism of rupture was also observed for samples with angular notches of 90°, 60°, and 30°. As for samples with circle segment notches, the increase in the radius of curvature significantly increased the ultimate tensile strength and toughness of the photoreceptor samples. This result is due to the greater dispersion of stress along the edge of a larger arc. For samples with rectangular notches, lower tensile strength was observed for samples with sharp corners due to stress concentration at these corners leading to initiation of a tear. The observed rupture mechanism through the corner was the same as that which occured in samples with angular notches. However, when these corners are rounded, a significant degree of improvement in the mechaincal properties of the photoreceptor was achieved.

EXAMPLE IX

A third set of rectangular photoreceptor samples were prepared as described in Example I were tested to determine the effects of a notch having a rectangular shape. Multiple samples were taken from a flexible, seamed, multilayered Xerox 1075 ®Copier/Duplicator photoreceptor belt. The belt comprised an anti-curl back layer, a polyseter supporting substrate layer, a charge blocking layer, an adhesive layer, an aluminum conductive ground plane, a charge generating layer and a charge transport layer. The anti-curl back layrer, substrate layer, adhesive layer, generating layer and transport layer each contaianed a thermoplasitc film forming polymer. The thickness of the photoreceptor belt was about 116 micrometers. The samples were slit from segments of the photoreceptor that were free of any seam. The rectangular samples were cut from the photoreceptor belt and each had a length of 15.24 cm. The samples, other than a notch free rectangular control sample, were notched to form a rectangular notch, all notches having a length of 1 inch but with various radii of curvature around the corners for different samples. The notches were cut with the aid of a template and scalpel. The width of every sample at the sample neck (distance between the bottom of the notch and the notch free side) was 1.27 cm (0.5 inch). The shapes, other than that of the rectangular control sample, generally resembled the sample shown in FIG. 12. The results for the ultimate tensile strength (UTS) measurements with a notch depth of 0.1 cm, crosshead speed at 0.2 inch/min, and chart speed at 2 inch/min are tabualted in Table 3 below.

TABLE 3

Ultimate Tensile Properties Using Rectangular Notches

| Sample | Length of Notch | UTS KG/CM | Area Under Stress Elongation Curve |
|---|---|---|---|
| Sharp Corner | 2.54 cm | 10.73 | <4 |
| Rounded Corner Rad. = 0.15 cm | 2.54 cm | 12.41 | 21 |
| Rad. = 0.30 cm | 2.54 | 12.95 | 26 |
| Rad. = 0.45 cm | 2.54 | 13.20 | 28 |
| Rad. = 0.64 cm | 2.54 | 13.93 | 48 |
| Rad. = 0.95 cm | 2.54 | 14.67 | 90 |
| Rad. = 1.27 cm | 2.54 | 15.41 | 151 |
| Control | without notch | 15.21 | 154 |

As seen in columns 3 and 4 of the table, the UTS and area integrated under the stress-elongation curves increased steadily as the radius of curvature increased and reached a maximum value for the sample having a radius of curvature of 1.27 cm (0.5 inch). With this configuration, the value of UTS and area under the (s-e) curve of the notched sample is identical with the value obtained for the control sample. These results show that a rectangular notch with rounded corners such as the samplej with a notch length of 2.54 cm (1 inch) and radius of curvature of 1.27 cm (0.5 inch) yielded an optimum strength.

EXAMPLE X

A fourth set of rectangular photoreceptor samples were prepared as described in Example I were tested to determine the effects of a notch having a rectangular shape. Multiple samples were taken from two flexible, seamed, multilayered Xerox 1075 ® Copier/Duplicator photoreceptor belts. The belt comprised an anti-curl back layer, a polyester supporting substrate layer, a charge blocking layer, an adhesive layer, a charge generating layer and a charge transport layer. The anti-curl back layer, substrate layer, an aluminum conductive ground plane, adhesive layer, generating layer and transport layer each contained a thermoplastic film forming polymer. The thickness of the photoreceptor belt was about 116 micrometers except at the ground strip at at the welded seam. The a ground strip ran along one long edge of the photoreceptor. The thickness of the photreceptor at the ground strip location was about 106 micrometers. This ground strip had a width of about 0.9 cm and comprised sa film forming binder and conductive carbon paritcles. The samples were slit from segments of the photoreceptor that contained a seam formed from ultrasonically welded overlapped edges of the photoreceptor and the long edge which contained the photoreceptor grounding strip, while others contained the long edge of the photoreceptor opposite to the ground strip. The seam extended across the middle of each sample from one long edge to the other. The width of the seam overlay was 0.13 cm. The rectangular samples each had a length of 15.24 cm. The samples, other than the rectangular control samples with a 0.7 cm circular notch, were notched to form a rectangular notch which straddled the seam, all non-control notches had a length of 1 inch and a radius of curvature of 1.27 cm (0.5 inch). Some of the samples (incuding a control) had notches that straddled the seam on the side bearing the ground strip and other samples (including a control) were notched on the side opposite to the ground strip. The width of every sample the sample neck (distance between the bottom of the notch and the notch free side) was 0.27 cm (0.5 inch). The shape of the control samples is shown in FIG. 13. The shape of the notch of this invention (rectangular with round corners) sample is shown, for example, in FIG. 14. The results for the ultimate tensile strength (UTS) measurements with a notch depth of 0.1 cm, crosshead speed at 0.2 inch/min, and chart speed at 2 inch/min are tabulated in Table 4 below.

TABLE 4

Samples Notched Through Seam

| Sample | Description | UTS, Kg/cm |
|---|---|---|
| Ground Strip (Control) | 0.7 cm Circular Notch | 7.04 |
| Ground Strip (Reactangular notch) | L = 2.54 cm R = 1.29 cm | 9.76 |
| Opp. to the Ground Strip (Control) | 0.7 cm Circular Notch | 7.15 |
| Opp. to the Ground Strip (Reactangular notch) | L = 2.54 cm R = 1.29 cm | 9.83 |

The UTS for both samples (samples with rectangular notch on the ground strip edge and samples with rectangular notch on the side opposite to the ground strip edge) were significantly higher that the UTS values obtained for the standard 0.7 cm circular notch control samples.

EXAMPLE XI

The effectiveness of the notch design of this invention for improving seam performance was demonstrated in a test of three belts from the Xerox 1075 ® Copier/-duplicator machine. Each of these belts had a thickness of about 116 micrometers and an ultrasonically welded seam having a width of about 1.3 mm. The belts were were notched to form a rectangular notch which straddled the welded seam on the ground strip edge side and on the side opposite to the ground strip edge. All notches had a length of 2.54 cm (1 inch), radius of curvature of 1.27 cm (0.5 inch) 0.5 inch at each of the notch and a depth of 0.1 cm. With this notch structure, all three belts were cycled to make 172,000 copies without seam failure. Twenty one bilts from the Xerox 1075® Copier/Duplicator machine having a 0.7 cm circular notch at end of the seam were also tested under identical test conditions. Three out the twenty one belts exhibited seam rupture between 29,000 and 46,000 copies while the remaining belts failed prior to 120,000 copies.

Although the invention has been described with reference to specific prefered embodiments, it is not intended to be limited thereto, rather those skilled in the art will recognize that variations and modifications may be made therein which are within the spirit of the invention and within the scope of the claims.

What is claimed is:

1. A flexible belt fabricated from a substantially rectangular sheet having a first edge joined to a secnd parallel edge to form a seam, said seam having one end which terminates at a third edge and another end which terminates at a fourth edge, said third edge and said fourth edge being substantially perpendicular to said first and second edges, said third edge having a notch straddling said seam end, said notch having a bottom parallel to said third and fourth edges, said bottom extending in each direction from the centerline of said seam for a distance of between 100 and about 400 times the thickness of said web, said notch having a depth of between about 4 and about 20 times the thickness of said web, said notch having substantially identical ardcuate sides defined by a radius of curvature having a length of between about 40 and about 200 times greater than the thickness of said web, and one end of each said arcuate sides being substantially tangent to said bottom of said notch.

2. A flexible belt according to claim 1 wherein said belt is an electrostatographic imaging member.

3. A flexible belt according to claim 1 wherein said belt is an electrographic imaging member.

4. A flexible belt according to claim 1 wherein said belt is an electrophotographic imaging memger.

5. A flexible belt according to claim 1 wherein said seam comprises a lap joint of said first edge over said second parallel edge.

6. A flexible belt according to claim 5 wherein said seam is ultrasonically welded.

7. A flexible belt according to claim 5 wherein said belt comprises a substrate having an electrically conductive surface and a dielectric layer.

8. A flexible belt according to claim 1 wherein said belt comprises a substrate having an electrically conductive surface, a charge blocking layer, a charge generating layer, and a charge transport layer.

9. A flexible belt according to claim 1 wherein said belt comprises an anti-curl backing layer, a substrate having an electrically conductive surface, a charge blocking layer, a charge generating layer, and a charge transport layer.

10. A flexible belt according to claim 1 wherein said belt bottom extends in each direction from the centerline of said seam for a distance of between 150 and 350 times the thickness of said web.

11. A flexible belt according to claim 1 wherein said belt bottom extends in each direction form the centerline of said seam for a distance of between 200 and about 300 times the thickness of said web.

12. A flexible belt according to claim 1 wherein said notch has a depth of between about 6 and about 15 times the thickness of said web.

13. A flexible belt according to claim 1 wherein said notch has a depth of between about 7 and about 12 times the thickness of said web.

14. A flexible belt according to claim 1 wherein said arcuate sides are defined by a radius of curvature having a length of between about 60 and about 180 times greater than the thickness of said web.

15. A flexible belt according to claim 1 wherein said arcuate sides are defined by a radius of curvature having a length of between about 80 and about 150 times greater than the thickness of said web.

16. A flexible belt according to claim 1 wherein said belt has a thickness between about 70 micrometers and about 160 micrometers.

17. A flexible belt according to claim 1 wherein said fourth edge has a notch at an end of said seam, said notch having a bottom parallel to said third and fourth edges, said bottom extending in each direction from the centerline of said seam for a distance of between 100 and about 400 times the thickness of said web, said notch having a depth of between about 4 and about 20 times the thickness of said web, said notch having substantially identical arcuate sides defined by a radius of curvature having a length of between about 40 and about 200 times greater than the thickness of said web, and one end of each said arcuate sides being substantially tangent to said bottom of said notch.

18. A process for fabricating a notched belt comprising providing a flexible substantially rectangular sheet having a first edge and second parallel edge, overlapping a segment of said first edge over a segment of said second parallel edge, welding said first edge to said second parallel edge to form a welded seam, said seam having one end which teminates at a third edge and another end which terminates at a fourth edge, said third edge and said fourth edge being substantially perpendicular to said first and second edges and cutting a notch along said third edge, said notch straddling said end of said seam, said notch having a bottom parallel to said third and fourth edges, said bottom extending in each direction from the centerline of said seam for a distance of between 100 and about 400 times the thickness of said web said notch having a depth of between about 4 and about 20 times the thickness of said web, said notch having sustantially identical arcuate sides defined by a radius of curvature having a length of between about 40 and about 200 times greater than the thickness of said web, and one end of each said arcuate sides being substantially tangent to said bottom of said notch.

19. A process for fabricating a notched belt according to claim 18 including cutting a notch along said fourth edge at an end of said seam, said notch having a bottom parallel to said third and fourth edges, said bottom extending in each direction from the centerline of said seam for a distance of between 100 and about 400 times the thickness of said web, said notch having a depth of between about 4 and about 20 times the thickness of said web, said notch having substantially identical arcuate sides defined by a radius of curvature having a length of between about 40 and about 200 times greater than the thickness of said web, and one end of each said arcuate sides being substantially tangent to said bottom of said notch.

20. A process for fabricating a notched belt according to claim 18 wherein said belt has a thickness between about 70 micrometers and about 160 micrometers.

* * * * *